United States Patent
Lelievre et al.

(10) Patent No.: US 11,603,106 B2
(45) Date of Patent: Mar. 14, 2023

(54) SYSTEM FOR VEHICLE SEAT COMPRISING A FUNCTIONAL DEVICE, AN INPUT INTERFACE, AND A CONTROL DEVICE

(71) Applicant: Faurecia Sièges d'Automobile, Nanterre (FR)

(72) Inventors: Francois Lelievre, Antony (FR); Pierre-Henri Petiphar, Etampes (FR); Christophe Cazes, Versailles (FR)

(73) Assignee: Faurecia Sièges d'Automobile, Nanterre (FR)

( * ) Notice: Subject to any disclaimer, the term of this patent is extended or adjusted under 35 U.S.C. 154(b) by 655 days.

(21) Appl. No.: 16/360,638

(22) Filed: Mar. 21, 2019

(65) Prior Publication Data
US 2019/0291741 A1     Sep. 26, 2019

(30) Foreign Application Priority Data

Mar. 21, 2018  (FR) ..................... 18 52401

(51) Int. Cl.
*B60W 50/00* (2006.01)
*G06F 16/23* (2019.01)
(Continued)

(52) U.S. Cl.
CPC ......... *B60W 50/0098* (2013.01); *B60N 2/002* (2013.01); *B60N 2/0244* (2013.01);
(Continued)

(58) Field of Classification Search
CPC .......... B60W 50/0098; G06F 16/2379; B60N 2/002; B60N 2/0244; B60N 2/0248;
(Continued)

(56) References Cited

U.S. PATENT DOCUMENTS 5,197,564 A * 3/1993 Nishimura ............. B60K 31/04
                                                                180/170
5,291,748 A * 3/1994 Ueda ................... B60H 1/00742
                                                                236/78 D
(Continued)

FOREIGN PATENT DOCUMENTS

| CN | 107696921 A | * | 2/2018 | ........... B60N 2/0232 |
| CN | 107696921 B | * | 6/2020 | ........... B60N 2/0232 |
| FR | 2977221 A1 | | 1/2013 | |

OTHER PUBLICATIONS

French Search Report corresponding to French application No. FR 1852401, dated Nov. 21, 2018, 8 pages.
(Continued)

*Primary Examiner* — Shelley Chen
(74) *Attorney, Agent, or Firm* — Reising Ethington P.C.

(57) ABSTRACT

A system for a vehicle seat includes: a functional device able to selectively occupy Np states, where Np is a positive integer; an input interface configured for collecting Nm parameters, where Nm is a positive integer, related to the vehicle and/or to the seat and/or to a user of the seat; a control device configured for changing the functional device from one of the Np states to another of the Np states; a control interface enabling the user to set the functional device, via the control device, to the state to be in; and a data storage unit. The system is configured for sending the values of the Nm parameters to the data storage unit each time the user places the functional device in one of the Np states.

17 Claims, 2 Drawing Sheets

(51) Int. Cl.
  *G05B 19/402* (2006.01)
  *B60N 2/02* (2006.01)
  *B60N 2/00* (2006.01)
  *B60N 2/90* (2018.01)
  *B60N 2/56* (2006.01)

(52) U.S. Cl.
  CPC ........ *B60N 2/0248* (2013.01); *G05B 19/402* (2013.01); *G06F 16/2379* (2019.01); *B60N 2/0224* (2013.01); *B60N 2/56* (2013.01); *B60N 2/976* (2018.02); *B60N 2002/0268* (2013.01); *G05B 2219/40175* (2013.01)

(58) Field of Classification Search
  CPC ........ B60N 2/976; B60N 2/0224; B60N 2/56; B60N 2002/0268; G05B 19/402; G05B 2219/40175
  See application file for complete search history.

(56) References Cited

U.S. PATENT DOCUMENTS

| | | | | |
|---|---|---|---|---|
| 5,511,724 | A * | 4/1996 | Freiberger | G05D 23/1917 454/75 |
| 6,084,315 | A | 7/2000 | Schmitt | |
| 6,498,958 | B1 * | 12/2002 | Tateishi | G05B 13/024 706/14 |
| 6,744,370 | B1 * | 6/2004 | Sleichter, III | B60N 2/56 340/576 |
| 10,023,024 | B2 * | 7/2018 | Carlesimo | B60H 1/00657 |
| 2001/0045099 | A1 * | 11/2001 | Ohga | B60H 1/00971 62/186 |
| 2002/0088271 | A1 * | 7/2002 | Sigwart | G01M 99/002 73/114.61 |
| 2003/0051491 | A1 * | 3/2003 | Kawai | B60H 1/00892 236/91 C |
| 2003/0164000 | A1 * | 9/2003 | Ohga | B60H 1/0073 62/190 |
| 2004/0050078 | A1 * | 3/2004 | Choi | F25D 25/021 62/186 |
| 2005/0238339 | A1 | 10/2005 | Bargheer et al. | |
| 2008/0053128 | A1 * | 3/2008 | Takeda | B60H 1/00821 62/244 |
| 2008/0264087 | A1 * | 10/2008 | Harumoto | F24F 11/46 62/190 |
| 2010/0020028 | A1 | 1/2010 | Laurent et al. | |
| 2011/0015826 | A1 * | 1/2011 | Ripoll | B60H 1/00735 701/36 |
| 2012/0173089 | A1 * | 7/2012 | Maeda | B60N 2/0248 701/49 |
| 2013/0345903 | A1 * | 12/2013 | Nakagawa | G07C 5/008 701/2 |
| 2014/0207312 | A1 * | 7/2014 | Rouyer | B60R 16/037 701/2 |
| 2014/0309911 | A1 * | 10/2014 | Le | G01R 31/367 320/109 |
| 2015/0105641 | A1 * | 4/2015 | Austin | B60N 2/002 600/364 |
| 2017/0154477 | A1 * | 6/2017 | Chung | G11B 27/005 |
| 2017/0203742 | A1 * | 7/2017 | Brinkmann | B60T 17/004 |
| 2017/0326944 | A1 * | 11/2017 | Carlesimo | B60H 1/00778 |
| 2018/0134116 | A1 * | 5/2018 | Chen | B60H 1/00764 |
| 2018/0336260 | A1 * | 11/2018 | Furuichi | G06F 16/275 |
| 2019/0164421 | A1 * | 5/2019 | Lauer | B60H 1/00742 |

OTHER PUBLICATIONS

ES-Key Climate Control Module data sheet, Product Sheet 610-00029.
"What is a Throttle Response Control Module?" Motortrend Magazine, accessed Dec. 29, 2021.

* cited by examiner

SYSTEM FOR VEHICLE SEAT COMPRISING A FUNCTIONAL DEVICE, AN INPUT INTERFACE, AND A CONTROL DEVICE

TECHNICAL FIELD

The invention relates to vehicles and in particular to motor vehicles. The invention also relates to vehicle seats and more specifically to systems for such seats which comprise a functional device having the function of ensuring the comfort of users of these seats.

BACKGROUND

A vehicle generally comprises at least one seat intended to accommodate a driver or passenger of the vehicle. The seat may be intended to accommodate one person, when it is a single seat, for example arranged at the front of the vehicle. The seat may also be part of a bench seat able to accommodate multiple people, for example a rear seat of a vehicle. Thus, in the sense of the invention, the term "seat" means an individual seat, as well as a part of a bench, and the bench itself. In addition, the term "seat" according to the invention refers both to a front seat of the vehicle and a rear seat of the vehicle. Similarly, the invention can be implemented for seats intended for any type of vehicle, and in particular motor vehicles.

The seat generally comprises at least one system comprising a functional device. The functional device may for example be a device for massaging the user of the seat, a seat heating device, or a seat ventilation device. Of course, the system often comprises an assembly of multiple functional devices.

The functional device may be placed in a plurality of distinct states. For example, a seat ventilation device may be in an off state. It may also be in a first-level operational state. It may also be in a second-level operational state where the ventilation is blowing with more power than in the first level. In this case, the ventilation device can selectively be placed in three distinct states.

The system further comprises a control device for controlling the functional device. The control device allows the user, by means of a control interface, to place the functional device in one of the possible states of the functional device.

The control device may also be connected to a sensor that measures a parameter related to the seat, to the vehicle, or to the seat user. This parameter may be for example the temperature of the user or a humidity level in a passenger compartment containing the seat.

The control device is generally preset so that when the sensor measures a certain value of the parameter, the control device actuates the functional device. However, the preset value of the control device may not suit the user.

SUMMARY

One aim of the invention is to provide a system for a vehicle seat that is adapted to different user profiles.

To do this, the invention in at least some embodiments provides a system for a vehicle seat, comprising:
  a functional device able to selectively occupy Np states, where Np is a positive integer,
  an input interface configured for collecting Nm parameters, where Nm is a positive integer, related to the vehicle and/or to the seat and/or to the seat user,
  a control device configured for changing the functional device from one of the Np states to another of the Np states,
  a control interface enabling the user to set the functional device, via the control device, to the state to be in,
  a data storage unit,
characterized in that the system is configured for:
  sending the values of the Nm parameters to the data storage unit each time the user places the functional device in one of the Np states.

The system is thus configured for recording the values of the Nm parameters, when the user of the system places the functional device in one of the Np states, and for sending these values to a data storage unit. "The system is configured for sending the values of the Nm parameters to the data storage unit each time the user places the functional device in one of the Np states" is understood to mean that an element of the system, different from the storage unit, is configured for sending the aforementioned data to the data storage unit. This element of the system may in particular be the control device or a dedicated communication device connected to the input interface, control device, and data storage unit.

The storage unit is therefore able to determine the context in which the user is placing the functional device in each of the Np states. It is thus possible to accurately evaluate the behavior of the user towards the functional device and adjust the operation of the functional device so that it corresponds to the user. The system thus makes it possible to provide vehicle seats that better suit the user.

In various embodiments of the system according to the invention, one or more of the following provisions may possibly be used:
  the control device is configured for sending the values of the Nm parameters to the data storage unit each time the user places the functional device in one of the Np states;
  the input interface is able to collect the Nm parameters by means of at least one sensor;
  the input interface is able to collect the Nm parameters by means of at least one data entry by the user;
  the input interface is thus able to collect values of the Nm parameters by means of a sensor as well as by data entry by the user; it should be noted, however, that collecting the values of the Nm parameters by sensor is preferred, as in this case the user does not need to input the data, which improves the ergonomics of the system;
  the data storage unit to which the system is configured to send the values of the Nm parameters each time the user places the functional device in one of the Np states, is a server remote from the seat.
  thus, a remote and centralized server can process a large amount of data coming from a large number of seats comprising the system according to the invention ◘
  the data storage unit to which the system is configured to send the values of the Nm parameters each time the user places the functional device in one of the Np states, is placed in the seat;
  the seat can thus operate autonomously;
  the data storage unit is configured for calculating at least one degree of correlation between one of the Nm parameters and the state of the functional device;
  this feature makes it possible to provide a particularly advantageous system in the context of the invention, since it allows better and more precise fine-tuning of the management of at least one element of the seat, the storage unit therefore being able to determine which of the Nm parameters influence the change of state of the functional device; moreover, the storage unit may also be able to exclude isolated aberrant values measured for the Nm parameters during the change of state of the functional device;

the data storage unit is configured for:
  receiving, from the system, the values of the Nm parameters respectively collected by the input interface and information concerning the state of the functional device,
  recording the values of the Nm parameters collected by the input interface,
  defining, from the recorded values, at least Nm ranges of values respectively associated with the Nm parameters and with at least one of the Np states, and
  sending information defining the at least Nm ranges to the control device;

this sending to the control device can be done directly or via the aforementioned communication device; the storage unit is thus able to analyze the behavior of the user;

the control device is further configured for:
  receiving, from the data storage unit, Nm ranges of values respectively associated with the Nm parameters and with one of the Np states, and
  placing the functional device in this state when the input interface collects values of the Nm parameters within the Nm ranges of values;

the control device thus limits the number of operations to be performed by the seat user;

the seat is therefore simpler to use;

the system is further configured for sending periodically to the data storage unit, preferably every second or every millisecond, the values of the Nm parameters collected by the input interface;

the system is further configured for sending periodically to the data storage unit, preferably every second or every millisecond, information concerning the state occupied by the functional device;

the remote server can therefore regularly calculate and analyze the values of the Nm parameters and the state the functional device is in. In some embodiments, the invention also provides an assembly comprising Z systems as described above, where Z is a positive integer, the data storage unit being the remote server which is also a central server for the Z seats, the central server being configured for:

receiving, from the Z systems, values of the Nm parameters respectively collected by the input interfaces of the Z systems and information concerning the state of the Z respective functional devices of the Z systems,
recording the values of the Nm parameters collected by the input interfaces of the Z seats,
defining, from the recorded values, at least Nm ranges of values respectively associated with the Nm parameters and with at least one of the Np states;
sending information defining the at least Nm ranges to the Z systems.

In various embodiments of the assembly according to the invention, one or more of the following provisions may possibly be used:
  the central server is further configured for calculating at least one degree of correlation between one of the Nm parameters and the state of the functional device;
  the server is therefore able to determine which of the Nm parameters have an influence on the change of state of the functional device; moreover, the functional device is able to exclude isolated aberrant values measured for the Nm parameters during the change of state of the functional device;

the central server is further configured for:
  defining X user profiles from the values of the Nm recorded parameters, where X is a positive integer less than or equal to Z,
  associating one of the X user profiles with each of the Z systems,
  defining, for each of the X user profiles, Nm ranges of values respectively associated with the Nm parameters, and
  sending, to each of the Z systems, information defining the Nm ranges associated with the user profile with which the system is associated.

Also defined according to the invention is a vehicle seat comprising a system as previously defined.

Finally, the invention provides a method for using a system for a seat as defined above, comprising at least the following steps:
  the values of the Nm parameters are sent to the data storage unit each time the user places the functional device in one of the Np states.

The method may also comprise the following steps:
  Nm ranges of values respectively associated with the Nm parameters and with one of the Np states are received from the data storage unit, and
  the functional device is placed in this state when the input interface collects values of the Nm parameters that are within the Nm ranges of values.

BRIEF DESCRIPTION OF DRAWINGS

The present invention will be better understood and other features and advantages will be apparent from reading the following detailed description of three embodiments, given as non-limiting examples, with reference to the following figures.

DETAILED DESCRIPTION

For the sake of clarity, only the elements useful to understanding the described embodiments are represented and will be described. One will further note that in FIGS. 2 to 4, the arrows represent the sending of information from one element to another.

Figure 1:
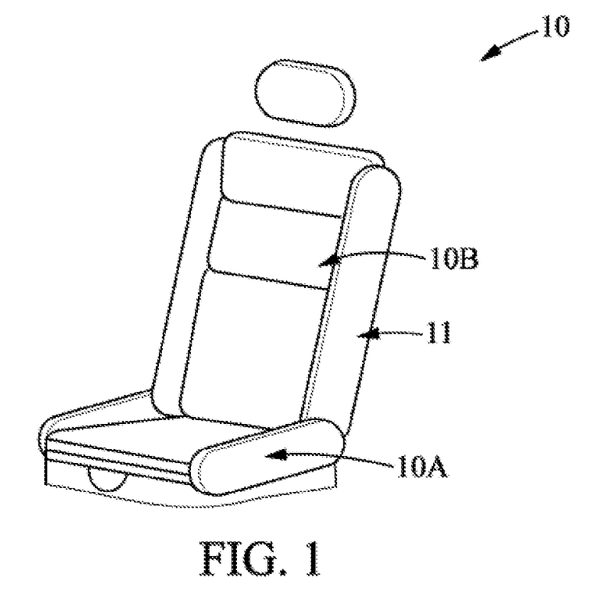
FIG. 1 is a view of a vehicle seat comprising a system according to a first embodiment of the invention.

Represented in FIG. 1 is a seat 10 placed in the passenger compartment of a vehicle. Note that according to the invention, the vehicle may be of any type, particularly an automobile. In addition, the seat 10 may of course be a front seat or a rear seat of the vehicle. The seat 10 comprises a seating portion 10A and a backrest 10B.

In addition, the seat 10 comprises a system 11 described below. One will note that the system 11 may be placed entirely within the seat 10 but more generally it is placed in the passenger compartment of the vehicle. Thus, it may for example be partially placed within the seat 10 and partially placed in the rest of the passenger compartment.

Figure 2:
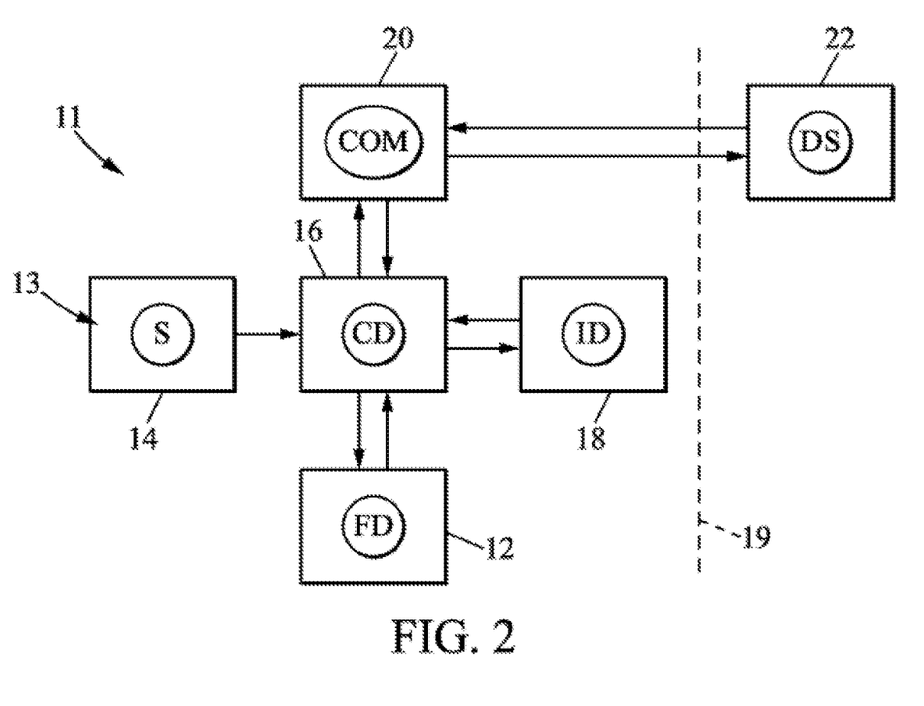
FIG. 2 is a block diagram illustrating the operation of this seat.

1. First Embodiment: System 11 Evaluating a Single Parameter and Functional Device that can Selectively Occupy Two States As schematically illustrated in FIG. 2, the system 11 for the seat 10 comprises a functional device. The functional device may be of any type. In this embodiment, the functional device is a heating device 12 for the seat 10. The functional device may also be a ventilation device for the seat 10 with or without a heating mat, or a massage device for the seat 10, or a device configured for adjusting a position of the seat 10. "Adjusting a position of the seat 10" is understood to mean a position of the seat 10 within the passenger compartment, for example along the direction of travel of the vehicle comprising the seat 10, in other words a longitudinal adjustment, as well as a relative position of two elements of the seat 10, for example a relative position of the seat 10A and the backrest 10B, in other words adjusting the tilt of the backrest 10B, or the cushion edges of the backrest 10B or seating portion 10A. Finally, this may also be understood to mean a device configured for adjusting the shape of the seat 10, such as a lumbar adjustment or a front edge adjustment of the seating portion 10A. This also can refer to a height adjustment of the seat 10.

In FIG. 2, a separation between the interior and exterior of the vehicle that houses the seat 10 is indicated by a dotted line 19.

The heating device 12 of the seat 10 comprises a heating mat housed in the seating portion 10A of the seat 10. It is able to selectively occupy two distinct states: an off state, where does not heat, and an active state, where it heats the seat 10. With reference to the vocabulary defined above, Np is equal to 2 in this embodiment.

In addition, the system 11 for the seat 10 comprises at least one temperature sensor 14, a control device 16 for the heating device 12, and a control interface 18 for the heating device 12. For example, the seat 10 and/or the vehicle may further comprise temperature sensors 14 of different types or located in different locations.

The temperature sensor 14 is for example housed in the backrest 10B in the vicinity of a cover on the backrest 10B. Thus, the temperature sensor 14 captures a temperature close to that of the back of a user of the seat 10. The temperature sensor 14 could also be arranged in the passenger compartment, for example in front of the seat 10. In the present embodiment, the temperature sensor 14 forms an input interface 13.

The control device 16 for the heating device 12 is connected to the heating device 12. It is configured for actuating the heating device 12 and changing it from the off state to the active state. It is also configured for deactivating it and thus changing it from the active state to the off state. The control device 16 for the heating device 12 is therefore configured for telling the heating device 12 what state to be in and more generally for causing the heating device 12 to change from one of the states it is able to occupy to another of the states it is able to occupy.

The control interface 18 for the heating device 12 is for example arranged on an armrest of the seat 10 and allows the user to control the actuation of the heating device 12 by means of the control device 16. The control interface 18 for the heating device 12 is thus connected to the control device 16. The control interface 18 may also be in the form of a smart phone connected to the control device 16, for example by means of a Wi-Fi connection.

In addition, as illustrated in FIG. 2, the temperature sensor 14 is connected to the control device 16 and is able to send it a measured temperature value. The control device 16 is configured so that the temperature sensor 14 sends it a measured temperature when the user changes, via the control interface 18, the state of the heating device 12. The control device 16 is also configured so that the temperature is measured by the temperature sensor 14 and transmitted to the control device 16 every second. According to a variant, it is measured and transmitted every tenth of a second, hundredth of a second, or thousandth of a second. With reference to the vocabulary defined above, Nm is equal to 1 in this embodiment. In addition, the input interface 13 is configured for collecting a parameter, namely the temperature.

In addition, the system 11 comprises a communication device 20 which may also be an integral part of the control device 20. The communication device 20 is connected to the control device 16 with which it is configured to exchange information. In addition, the communication device 20 is able to communicate with a data storage unit which here is a remote server 22. The communication device 20 can communicate with the server 22 over the Internet, for example on a Wi-Fi network. The control device 16 is therefore configured for communicating with the server 22 via the communication device 20. One will also note that, according to a variant of the present embodiment, the data storage unit is placed in the seat 10 so that it is an integral part thereof, or more generally in the passenger compartment of the vehicle. The data storage unit may for example be arranged in the dashboard of the vehicle.

In addition, the control device 16 is configured for sending the temperature value collected by the input interface 13 to the remote server 22, in the current case this value being measured by the temperature sensor 14, each time the user places the heating device 12 in one of two states that it is able to occupy. The control device 16 is also able to send information concerning the change of state, to the remote server 22. The control device 16 is therefore able to send information to the remote server 22 indicating that the heating device 12 has changed, due to action by the user, from the off state to the active state or from the active state to the off state.

Here, it is the control device 16 which is configured for sending the temperature value collected by the input interface, to the remote server 22. However, in general, it is the system 11 that is configured to do this. It may therefore comprise a device dedicated to this function which may or may not be integrated into the control device 16.

The remote server 22 is able to record and analyze this information and to calculate a correlation between the state of the heating device 12 and the temperature measured by the temperature sensor 14 at each change of state of the heating device 12. This correlation may be linear. The remote server 22 thus determines that the state of the heating device 12 and the temperature measured by the temperature sensor 14 are indeed connected.

From this calculation, the remote server 22 is able to define two temperature ranges respectively associated with the active state and the off state. The remote server 22 is also able to communicate these temperature ranges to the control device 16. The control device 16 thus saves these ranges so that when the temperature sensor 14 measures a temperature within one of the ranges, the control device 16 automatically switches the heating device 12 to the state associated with this range.

For example, the remote server 22 may define a first range corresponding to temperatures below 10° C. and corresponding to the active state of the heating device 12. The server may also define a second range corresponding to temperatures above 18° C. and corresponding to the off state of the heating device 12. Thus, when the temperature collected by the input interface 13, and therefore measured here by the temperature sensor 14, is less than 10° C., the control device 16 switches the heating device 12 to the active state. Then, when the temperature measured by the temperature sensor 14 rises above 18° C., the control device 16 switches the heating device 12 to the off state. The heating device 12 remains in the off state until the measured temperature is again below 10° C. The user no longer needs to use the control interface 18. The system 11 continuously adjusts the state of the heating device 12.

In addition, optionally, the control device 16 is configured for recording and regularly sending, preferably every second or tenth of a second or hundredth of a second or thousandth of a second or every millisecond, the temperature values collected by the input interface, measured here by the temperature sensor 14, and the information concerning the state of the heating device 12. This enables the remote server 22 to analyze the behavior of the user with a much larger amount of data.

The remote server 22 will now be described in more detail.

The remote server 22 is preferably a central server capable of receiving regularly measured temperatures from Z systems 11 of Z seats 10, Z being a positive integer, for example equal to 10,000. Associated with these measured temperatures is information concerning the state of the Z respective heating devices 12 of the Z systems 11 of the Z seats 10.

In addition, the remote server 22 is configured for recording and analyzing these data in order to send to each of the Z systems 11 two temperature ranges respectively associated with the two states of the heating device 12.

To do this, the remote server 22 calculates, separately for each system 11, the average temperature at which the respective heating devices 12 have switched from the off state to the active state and then the average temperature at which the heating devices have switched from the active state to the off state. Then, the remote server 22 specifically defines two temperature ranges associated with the two states, for each system 11. Thus, in the current case, the remote server 22 defines the two ranges associated with the two states of the heating device 12, individually for each of the Z systems 11. The remote server 22 then sends the information defining the two temperature ranges to the Z control devices 16 of the Z systems 11.

The remote server 22 is further configured for calculating a degree of correlation between the measured temperature and the state of the heating device 12, and for doing so in order to define the two ranges of values respectively associated with the two states.

Alternatively, the remote server 22 may be configured for calculating a general average of the temperatures at which the Z heating devices 12 have been actuated by the users and a general average of the temperatures at which the Z heating devices 12 have been turned off. In this case, the remote server 22 determines two identical ranges associated with the two states, for all the systems 11. Thus, in the current case, the remote server 22 defines the same two ranges associated with the two states of the heating device 12 for all of the Z systems 11. The remote server 22 then sends the information defining the two temperature ranges, to the Z control devices 16 of the Z systems 11.

The remote server 22 may also be configured for establishing X user profiles, where X is a positive integer less than or equal to Z. For example, the remote server 22 can establish a first profile grouping the users who on the average actuate their respective heating devices 12 between 10° C. and 15° C. In addition, the remote server 22 establishes a second profile grouping the users who on the average actuate their respective heating devices 12 between 5° C. and 10° C. Thus, in the current case, X=2. For each user profile, the remote server 22 calculates two ranges associated with the two states of the heating device 12 in the same manner as in the above paragraph. Thus, in the current case, for users who have similar behaviors, the remote server 22 defines the same two ranges associated with the two states of the heating device 12. The remote server 22 is further configured for sending, to each of the control devices 16 of the Z systems 11, information concerning the two temperature ranges corresponding to the profile to which the user of the system 11 belongs.

In the case where the system 11 comprises the data storage unit integrated into the seat 10, the data storage unit is preferably able to calculate the average temperature at which the heating device 12 changed from the off state to the active state, then the average temperature at which the heating device changed from the active state to the off state due to user action. Then, the data storage unit defines two temperature ranges associated with the two states. In addition, the data storage unit communicates these temperature ranges to the control device 16.

2. Second Embodiment: System 11 Evaluating Two Parameters and Functional Device that can Selectively Occupy Three States A second embodiment of the seat 10 will now be described, in particular with the assistance of FIG. 3. Numerical references for similar elements remain identical and only the differences from the first embodiment will be described.

Figure 3:
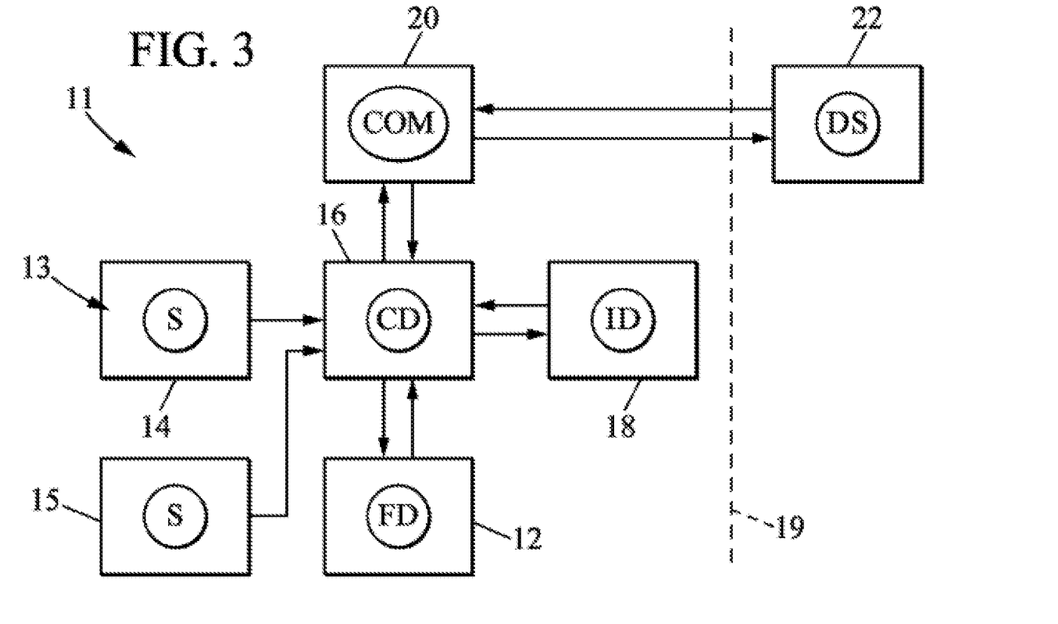
FIG. 3 is a block diagram illustrating the operation of a system for a seat according to a second embodiment of the invention.

The seat 10 according to this embodiment comprises a second sensor which is a humidity sensor 15. The humidity sensor 15 may also be housed in the backrest 10B near the seat cover. The humidity sensor 15 is also connected to the control device 16 to which it regularly sends the humidity values it measures, for example at a periodicity similar to that of the temperature sensor 14. The control device 16 is thus configured for regularly recording temperature and humidity values respectively measured by the temperature sensor 14 and humidity sensor 15. Thus, in this embodiment, and with reference to the vocabulary defined above, Nm is equal to 2. In addition, in the present embodiment the temperature sensor 14 and humidity sensor 15 form the input interface 13.

Here, the heating device 12 is able to be in three states: the off state, a first active state, and a second active state in which the heating device 12 heats with more intensity than in the first active state. Thus, Np is equal to 3 in this embodiment.

Again, the control device 16 is configured for recording temperature and humidity values each time the user changes the state of the heating device 12. The control device 16 is thus configured for sending these temperature and humidity values to the remote server 22.

The remote server 22 will process each of the temperature and humidity parameters in the same manner as indicated in item 1 of the description which concerns the first embodiment.

The remote server 22 is therefore configured for defining six ranges. Three temperature ranges are respectively associated with the three states of the heating device 12. Similarly, three humidity ranges are respectively associated with the three states of the heating device.

The remote server 22 sends these six temperature and humidity ranges to the control device 16. When the temperature and humidity conditions correspond to one of the three states of the heating device 12, the control device 16 controls the heating device 12 to be placed in that state.

One will note that the two temperature and humidity parameters are used to control the heating device 12 because the degree of correlation between these parameters and the state of the heating device 12 is considered satisfactory.

Optionally, when a degree of correlation, calculated by the remote server 22 or by the control device 16, between a parameter and the state of the heating device 12 is less than a predetermined correlation level, the server ignores this parameter and does not define a range of values for this parameter associated with this state.

One will further note that the remote server 22 is able to calculate a correlation between the temperature and humidity on the one hand and the state of the heating device 12 on the other hand. If the calculated level of correlation exceeds the calculated level of correlation between the temperature alone and the state of the system, this means that the humidity contributes additional information that increases the effectiveness of the analysis performed by the remote server 22. The remote server 22 is then configured for considering the temperature and humidity when determining the conditions under which the state of the heating device 12 is to be changed.

3. Third Embodiment: System 11 Evaluating Nm Parameters where Nm is a Positive Integer, and Functional Device that can Selectively Occupy Np States where Np is a Positive Integer We will now describe a third embodiment which is a generalization of those described in points 1 and 2 of the description.

The system 10 comprises an input interface 13 which is configured for collecting Nm parameters, where Nm is a positive integer, related to the vehicle and/or to the seat 10 and/or to the passenger compartment and/or to the user. These Nm parameters may comprise: a temperature in the passenger compartment or in the seat 10, a humidity level in the passenger compartment or in the seat 10, a user's heart rate, a position of the seat 10, both in the passenger compartment and as a relative position of two elements of the seat 10. Nm can thus be equal to at least one, two, three, four, five, six, seven, eight, nine, or ten.

The input interface 13 is configured for collecting the Nm parameters by means of at least one sensor and/or at least one data input by the user. The input interface 13 may be configured for allowing the user to manually enter his or her weight or height for example. One will note, however, that the exclusive use of sensors, and therefore at least Nm sensors, is preferred in order to limit the number of operations the user of the seat 10 must perform.

In addition, the functional device may also be a seat 10 ventilation device, a seat 10 cooling device, a device for massaging the user of the seat 10, or a device for adjusting the position of the seat 10, both in the passenger compartment and as a relative position of two elements of the seat 10. This functional device is able to occupy Np states, Np being a positive integer.

One will note that regardless of the functional device, the device is always able to occupy a finite number of states. In the case for example of the heating device 12, it can occupy a finite number of states and this finite number is a function of the precision in controlling the heating device 12. For example, if the control temperature of the heating device 12 can be varied in increments of 0.1° C. between 10° C. and 20° C., the heating device 12 can occupy 101 states.

The control device 16 is further configured for recording values measured regularly by the Nm sensors and for sending them to the remote server 22, and for associating with them information concerning the state of the heating device 12 among the Np possible states. The remote server 22 is, as indicated above, a central server for a large number of seats 10.

In addition, the control device 16 is able to receive instructions from the remote server 22, defining Nm ranges of values respectively associated with the Nm parameters for each of the Np states of the heating device 12.

The control device 16 is thus able to place the heating device 12 in one of the Np states when the values collected by the input interface for the Nm parameters are respectively within the Nm ranges of values.

Alternatively, the control device 16 is able to place the heating device 12 in one of the Np states when the value collected by the input interface 13 for at least one of the Nm parameters is within the range of values defined for that parameter.

In yet another alternative, the control device 16 is able to place the heating device 12 in one of the Np states when the values collected by the input interface 13 for at least J parameters, where J is a positive integer less than Nm, are respectively within the J ranges of values defined for those J parameters.

We will now describe the remote server 22 in more detail. The remote server 22 is able to receive values of the Nm parameters that are collected regularly, or at each change of state of the heating device 12 caused by the user, by the input interfaces 13 of the Z systems 11. These values are sent by the control devices 16, via the respective communication devices 20. As indicated above, Z is a positive integer, for example equal to 10,000. Associated with these values of the measured parameters Nm is information concerning the state of the Z respective heating devices 12 of the Z systems 11 of the Z seats 10.

In addition, the remote server 22 is configured for recording and analyzing these data, in order to send Nm ranges of values respectively associated with the Nm parameters and with at least one of the Np states, to each of the Z systems 11. Preferably, the remote server 22 is configured for sending NmxNp ranges, for each of the Nm parameters, respectively associated with the Np states of the heating device 12.

To do this, the remote server 22 is configured for calculating, separately for each system 11, the Nm ranges associated with each of the Np states. Thus, in the current case, the remote server 22 defines the Nm ranges associated with each of the Np states of the heating device 12, individually for each of the Z systems 11. The remote server 22 then sends the information defining the NmxNp ranges to the Z control devices 16 of the Z systems 11.

Alternatively, the remote server 22 may be configured for calculating the NmxNp ranges globally for all Z systems 11. In this case, the remote server 22 determines Nm identical ranges associated with each of the Np states, for all the systems 11. Thus, in the current case, the remote server 22 defines the same ranges associated with the Np states of the heating device 12 for all Z systems 11. The remote server 22 then sends the information defining the NmxNp temperature ranges to the Z control devices 16 of the Z systems 11.

The remote server 22 may also be configured for establishing X user profiles, where X is a positive integer less than or equal to Z. For each user profile, the remote server 22 calculates NmxNp ranges in the same manner as in the above paragraph. Thus, in the current case, the remote server 22 defines the same Nm ranges associated with each of the Np states of the heating device 12 for users who have similar behaviors. The remote server 22 is further configured for sending, to each of the control devices 16 of the Z systems 11, information concerning the Nm temperature ranges, corresponding to each of the Np states, adapted to the profile to which the user of the system 11 belongs.

The remote server 22 is further configured for calculating at least one degree of correlation between one of the Nm parameters and the state of the functional device, from the data received from the Z respective control devices 16 of the Z seats.

Preferably, the remote server 22 is configured for calculating Nm degrees of correlation between each of the Nm parameters and the state of the functional device, in order to define with more precision the NmxNp ranges of values respectively associated with the two states. When one of the degrees of correlation is below a predetermined threshold, the parameter is considered irrelevant. In this case, the range associated with this parameter can be considered as being defined by the union of all values that this parameter can take.

The remote server 22 may also be configured for calculating at least one degree of correlation between two of the Nm parameters and the state of the functional device 12. The remote server 22 thus tests whether the two parameters interact synergistically with the state of the functional device 12, making it possible to refine the analysis of user behavior.

Of course, the remote server 22 may also be configured for calculating at least one degree of correlation between three, four, five, six, seven, or eight of the Nm parameters and the state of the functional device 12.

Figure 4:
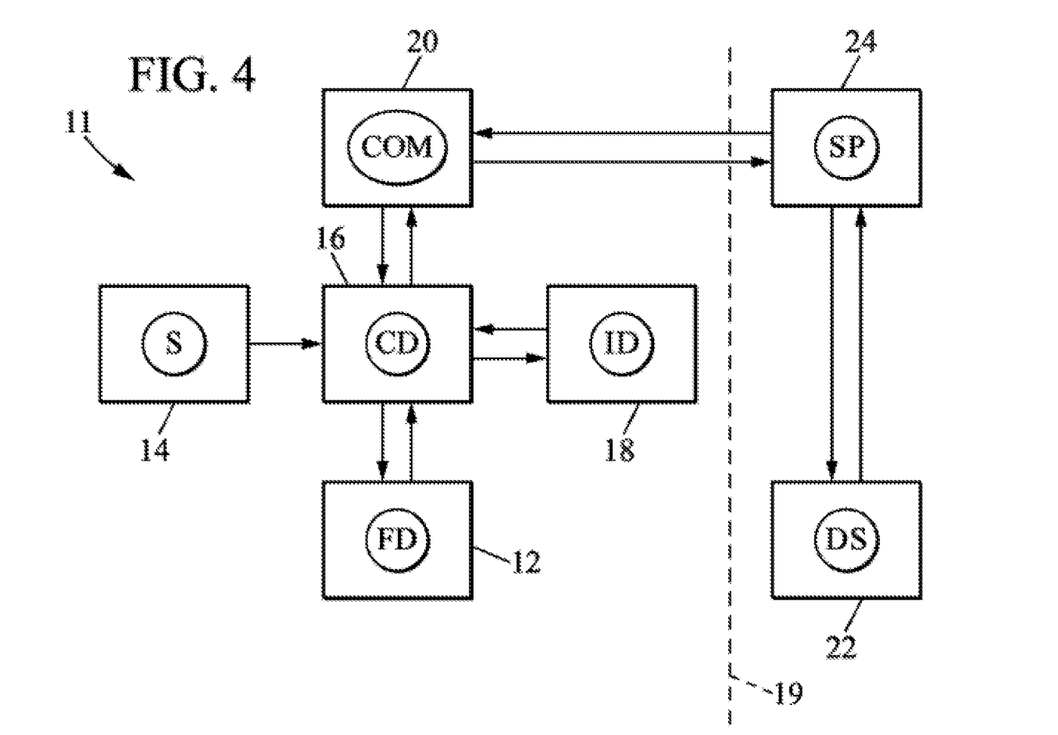
FIG. 4 is a block diagram illustrating the operation of the seat according to a variant of the first embodiment of the invention.

FIG. 4 illustrates a variant of the system 11 according to the first embodiment. In this variant, the communication device 20 is configured for communicating with the remote server 22 via an electronic telecommunications device carried by the user. Here, the electronic telecommunications device is in the form of the user's smart phone 24.

Of course, many variants of the invention may be applied without departing from its scope.

In particular, it is possible to use any type of sensor and to arrange them in any type of seat element.

The invention claimed is:

1. System for a vehicle seat, comprising:
    a functional device configured to selectively occupy Np states, where Np is a positive integer, said Np states comprising at least one state among an off state, a first level operational state and a second level operational state;
    control device configured for changing the at least one state of said functional device from one of the Np states to another of the Np states,
    a control interface enabling the user to control a change of the at least one state of the functional device, via the control device,
    a data storage unit,
    wherein the system comprises at least one sensor configured for collecting Nm parameters,
        where Nm is a positive integer, related to the vehicle and/or to the seat and/or to a user of the seat, wherein one or more sensors of the at least one sensor is configured for transferring said Nm parameters to the control device, and wherein the control device is configured for:
    sending the Nm parameters and the state of the functional device, to the data storage unit each time the user controls a change of the functional device, and wherein the data storage unit is configured for:
    receiving, from the system, the Nm parameters and information concerning the state of the functional device,
    recording the Nm parameters,
    defining, from the recorded Nm parameters, at least Nm ranges of values respectively associated with the Nm parameters and with at least one of the Np states, and
    sending information defining the at least Nm ranges to the control device.

2. System according to claim 1, wherein the data storage unit to which the system is configured to send the Nm parameters each time the user places the functional device in one of the Np states, is a server remote from the seat.

3. System according to claim 1, wherein the data storage unit to which the system is configured to send the Nm parameters each time the user places the functional device in one of the Np states, is placed in the seat.

4. System according to claim 1, wherein the data storage unit is configured for calculating at least one degree of correlation between one of the Nm parameters and the state of the functional device.

5. System according to claim 1, wherein the control device is further configured for:
    receiving, from the data storage unit, Nm ranges of values respectively associated with the Nm parameters and with one of the Np states, and
    placing the functional device in the state associated with the Nm ranges of values received when the Nm parameters within the Nm ranges of values are collected.

6. System according to claim 1, wherein the system is further configured for sending periodically to the data storage unit the Nm parameters collected.

7. System according to claim 1, wherein the system is further configured for sending periodically to the data storage unit information concerning the state occupied by the functional device.

8. Assembly comprising Z systems according to claim 2, where Z is a positive integer, and the remote server is a central server for the Z seats, the central server being configured for:
    receiving, from the Z systems, the Nm parameters respectively collected by the systems and information concerning the state of the Z respective functional devices of the Z systems,
    recording the Nm parameters collected by the sensors of the Z seats,
    defining, from the recorded Nm parameters, at least Nm ranges of values respectively associated with the Nm parameters and with at least one of the Np states, and
    sending information defining the at least Nm ranges to the Z systems.

9. Assembly according to claim 8, wherein the central server is further configured for calculating at least one degree of correlation between one of the Nm parameters and the state of the functional device.

10. Assembly according to claim 8, wherein the central server is further configured for:
- defining X user profiles from the Nm parameters, where X is a positive integer less than or equal to Z,
- associating one of the X user profiles with each of the Z systems,
- defining, for each of the X user profiles, at least Nm ranges of values respectively associated with the Nm parameters, and
- sending, to each of the Z systems, information defining the Nm ranges associated with the user profile with which the system is associated.

11. Vehicle seat comprising a system according to claim 1.

12. Method for using a system for a seat according to claim 1, comprising at least the following steps:
- the Nm parameters are sent to the data storage unit each time the user places the functional device in one of the Np states.

13. Method according to claim 12, further comprising the following steps:
- Nm ranges of values respectively associated with the Nm parameters and with one of the Np states are received from the data storage unit, and
- the functional device is placed in the state associated with the Nm ranges of values received when the Nm parameters that are within the Nm ranges of values are collected.

14. System according to claim 1, wherein the system is further configured for sending to the data storage unit every second the Nm parameters collected.

15. System according to claim 1, wherein the system is further configured for sending to the data storage unit every millisecond the Nm parameters collected.

16. System according to claim 1, wherein the system is further configured for sending to the data storage unit every second information concerning the state occupied by the functional device.

17. System according to claim 1, wherein the system is further configured for sending to the data storage unit every millisecond information concerning the state occupied by the functional device.

* * * * *